(No Model.)
B. W. SPARKS.
HORSE DETACHER.
No. 268,438. Patented Dec. 5, 1882.
Fig. 1.
Fig. 2.
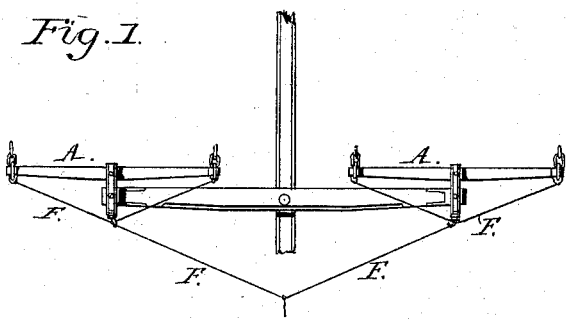
Fig. 3.
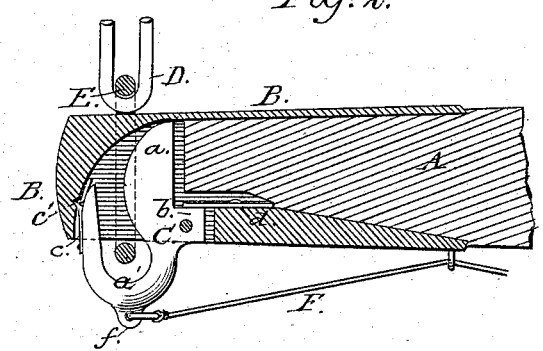
Witnesses:
Inventor:
Benj. W. Sparks
per Edw. W. Dunn
Attys.

United States Patent Office.

BENJAMIN W. SPARKS, OF McMINNVILLE, TENNESSEE, ASSIGNOR OF ONE-HALF TO WILLIAM T. MURRAY, OF SAME PLACE.

HORSE-DETACHER.

SPECIFICATION forming part of Letters Patent No. 268,438, dated December 5, 1882.

Application filed May 15, 1882. (No model.)

*To all whom it may concern:*

Be it known that I, BENJAMIN W. SPARKS, of McMinnville, Warren county, Tennessee, have invented a new and useful Improvement in Horse-Detachers for Vehicles and Agricultural Machinery, of which the following is a specification.

My invention is an improvement in devices for detaching horses from vehicles.

It consists, in connection with a single-tree of a vehicle, of certain hooks or catches, which are so formed and secured in place in the ends of said single-tree as to hold the hooks or rings of a tug or the loops of a trace, except when it should be necessary to release the horse or horses from the vehicle, and more particularly when the animal is unmanageable, in which event the trace or tug may be readily unfastened by simply drawing a cord, within reach of the driver, to revolve the said catches or hooks about their axes and throw the trace rings or hooks off from the single-tree and allow the said animal to go free.

In my drawings, Figure 1 is a plan of a double-tree and two single-trees and the application of my detaching device to the same. Fig. 2 is a sectional view of one end of a single-tree, showing the detaching-catch in position to hold the trace. Fig. 3 is a similar view, showing the catch unlocked after detaching.

Similar reference-letters indicate like parts in all of the figures.

Referring to the drawings, A is the single-tree, provided with ferrules B, slotted at the ends to form spaces to receive a portion of the detaching-catch.

C is the detaching catch or hook, composed of a hook, $a'$, an eye for the detaching-cord, a cam, $a$, and a rectangular lug, $b$. The catch C is pivoted in the single-tree through the lug $b$, and moves in the slot provided for it. A spring, $d$, is secured in the single-tree, and bears upon one or another of the edge faces of the rectangular lug $b$ as the catch C is closed or open, holding it in either position.

D is the trace-hook, and E the ring linked to the same, and adapted to clasp the end of the single-tree, and which is held to place by the hook $a'$. To the end of the hook $a'$ of the detaching-catch is secured a spring, $c$, provided with a V-shaped projection adapted to engage a notch or offset in the ferrule B to assist in holding the detaching-catch in position to hold the trace-ring.

To the loop $f$ is fastened the cord F, which passes through several staples or loops fastened in the sides of the single-tree, and thence extending up over the dash-board of the vehicle within reach of the driver. When it is desirable to detach the traces from the single-tree the cord F is withdrawn to overcome the tension of the springs $c\ d$ and revolve the detaching-catch C to release the ring E. The cam $a$ now comes in contact with the said ring E and throws it entirely clear of the single-tree to free the trace or tug.

I do not wish to confine myself to any particular arrangement of springs for holding the detaching-catch in or out of position, nor do I wish to be confined to the exact form of detaching-catch shown in Figs. 2 and 3; but

What I claim as new, and desire to secure by Letters Patent, is—

1. The pivoted catch C, formed of the hook $a'$ and cam $a$, and provided with the locking-spring $c$, adapted to engage a notch or offset in the ferrule of a whiffletree, said catch being by its peculiar form and application capable of holding or detaching a harness-tug, as and for the purpose set forth.

2. The pivoted catch C, provided with hook $a'$, spring $c$, lug $b$, and cam $a$, adapted to move in a slot in the end of a whiffletree, which is provided with a notch, $c'$, and spring $d$, in combination with the ring E or loop of a tug, substantially as and for the purpose set forth.

BENJAMIN W. SPARKS.

Witnesses:
G. W. PARKS,
ISAAC HILL.